United States Patent
Smith et al.

(10) Patent No.: US 11,239,991 B2
(45) Date of Patent: Feb. 1, 2022

(54) SYSTEMS AND METHODS FOR TIMING RECOVERY WITH BANDWIDTH EXTENSION

(71) Applicant: MARVELL ASIA PTE, LTD., Singapore (SG)

(72) Inventors: Benjamin P. Smith, Ottawa (CA); Jamal Riani, Fremont, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

(21) Appl. No.: 16/860,403

(22) Filed: Apr. 28, 2020

(65) Prior Publication Data
US 2021/0336761 A1    Oct. 28, 2021

(51) Int. Cl.
*H04L 7/00* (2006.01)
*H04L 1/20* (2006.01)

(52) U.S. Cl.
CPC ............ *H04L 7/0062* (2013.01); *H04L 1/205* (2013.01); *H04L 7/0029* (2013.01); *H04L 7/0087* (2013.01)

(58) Field of Classification Search
CPC ..... H04L 1/205; H04L 7/0029; H04L 7/0062; H04L 7/0087
See application file for complete search history.

(56) References Cited

U.S. PATENT DOCUMENTS

| | | | |
|---|---|---|---|
| 10,382,047 B1* | 8/2019 | Li | H04L 25/0307 |
| 2010/0054318 A1* | 3/2010 | Chien | H04L 7/0062 375/226 |
| 2020/0304352 A1* | 9/2020 | Azenkot | H04L 25/03063 |

* cited by examiner

*Primary Examiner* — David B Lugo

(57) ABSTRACT

The present invention is directed to circuits and communication. More specifically, a specific embodiment of the present invention provides a timing recovery device with two stages. The first stage generates a clock signal to sample the received waveform, and the second stage provides timing-jitter mitigation. The second stage includes a jitter mitigation circuit with coefficients a function of the instantaneous jitter estimate, in addition to a jitter estimation tracking loop consisting of an error generator, a timing error detector and a loop filter to compensate for timing jitter associated with the clock signal. There are other embodiments as well.

19 Claims, 11 Drawing Sheets

SYSTEMS AND METHODS FOR TIMING RECOVERY WITH BANDWIDTH EXTENSION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to circuits and communication.

Over the last few decades, the use of communication networks has exploded. In the early days of the Internet, popular applications were limited to emails, bulletin board, and mostly informational and text-based web page surfing, and the amount of data transferred had been relatively small. Today, the Internet and mobile applications demand a huge amount of bandwidth for transferring photo, video, music, and other multimedia files, as more and more people use the Internet for media consumption. Data centers often need to transmit and process hundreds of terabytes of data hourly. With such high demands on data storage and data transfer, existing data communication systems need to be improved to address these needs.

Timing recovery is an important component of receivers. Timing recovery involves extracting clock rate from received data; the rate that a receiver processes the received data is based on extracted clock rate. Performance of the receiver depends, among other things, on the performance of its timing-recovery mechanism. Over the past, there have been many conventional timing recovery designs, but they have been inadequate. New and improved timing-recovery methods and systems are desired.

BRIEF SUMMARY OF THE INVENTION

The present invention is directed to circuits and communication. More specifically, a specific embodiment of the present invention provides a timing recovery device with two stages. The first stage adjusts a clock signal, and the second stage provides further jitter mitigation. The second stage includes a jitter mitigation circuit and a jitter estimation circuit, to reduce jitters associated with the clock signal. There are other embodiments as well.

According to an embodiment, the present invention provides a timing recovery apparatus, which includes a first stage circuit comprising an analog-to-digital converter (ADC) and an equalizer. The ADC is configured to digitize a data stream using a recovered clock signal. The recovered clock signal is impaired by timing jitter, which induces jitter-dependent inter-symbol interference (ISI) in the digitized data. The equalizer is configured to provide equalized data based on an output of the ADC. The apparatus also includes a second stage circuit. The second stage circuit includes a jitter mitigation circuit coupled to the equalizer and configured to output a signal with reduced jitter-dependent ISI. The second stage circuit also includes a jitter estimation circuit. The jitter estimation circuit includes an error generator configured to generate an error signal based on the output signal and a data detector signal.

According to another embodiment, the present invention provides a jitter mitigation circuit for timing recovery. The circuit includes a jitter mitigation circuit coupled to the equalizer and configured to generate an output signal with reduced jitter-dependent ISI. The jitter mitigation circuit has a finite response filter configured with multiple tap values, the tap values depending on an estimate of the instantaneous jitter. The circuit also includes a jitter estimation circuit, with an error generator configured to generate an error signal based on the output signal and a data detector signal. The circuit further includes a timing error detector (TED) configured to generate a timing error signal. The circuit additionally includes a loop filter configured to generate an estimate of the instantaneous timing jitter based on the timing error signal.

According to yet another embodiment, the present invention provides a receiver apparatus that includes an interface for receiving a data stream. The apparatus also includes a timing recovery module comprising a first stage circuit and a second stage circuit. The first stage circuit includes an analog-to-digital converter (ADC), which is configured to digitize the data stream using a recovered clock signal. The recovered clock signal is impaired by timing jitter. The first stage circuit also includes an equalizer configured to provide equalized data based on an output of the ADC. The second stage circuit includes a jitter mitigation circuit coupled to the equalizer and configured to generate an output signal with reduced timing-jitter-induced ISI.

It is to be appreciated that embodiments of the present invention provide many advantages over conventional techniques. Timing-recovery mechanisms according to the present invention can effectively compensate for jitter on a recovered clock. In various implementations, timing recovery mechanisms according to the present invention extend timing recovery bandwidth (e.g., to over 15 MHz) without adding to the design requirements (e.g., latency of existing receiver components) of other components in the receiver. Implemented in conjunction with a first stage timing recovery circuit, the second stage timing recovery circuit detects and reduces the residual jitter after the first-stage timing recovery.

Embodiments of the present invention can be implemented in conjunction with existing systems and processes. In various embodiments, the jitter mitigation circuit and the second stage circuit of a timing recovery device can be configured to allow modular implementation, thus facilitating their incorporation into various systems and apparatus. For example, timing recovery mechanisms according to the present invention can be manufactured using existing processes and thus can be easily and conveniently added onto existing designs. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
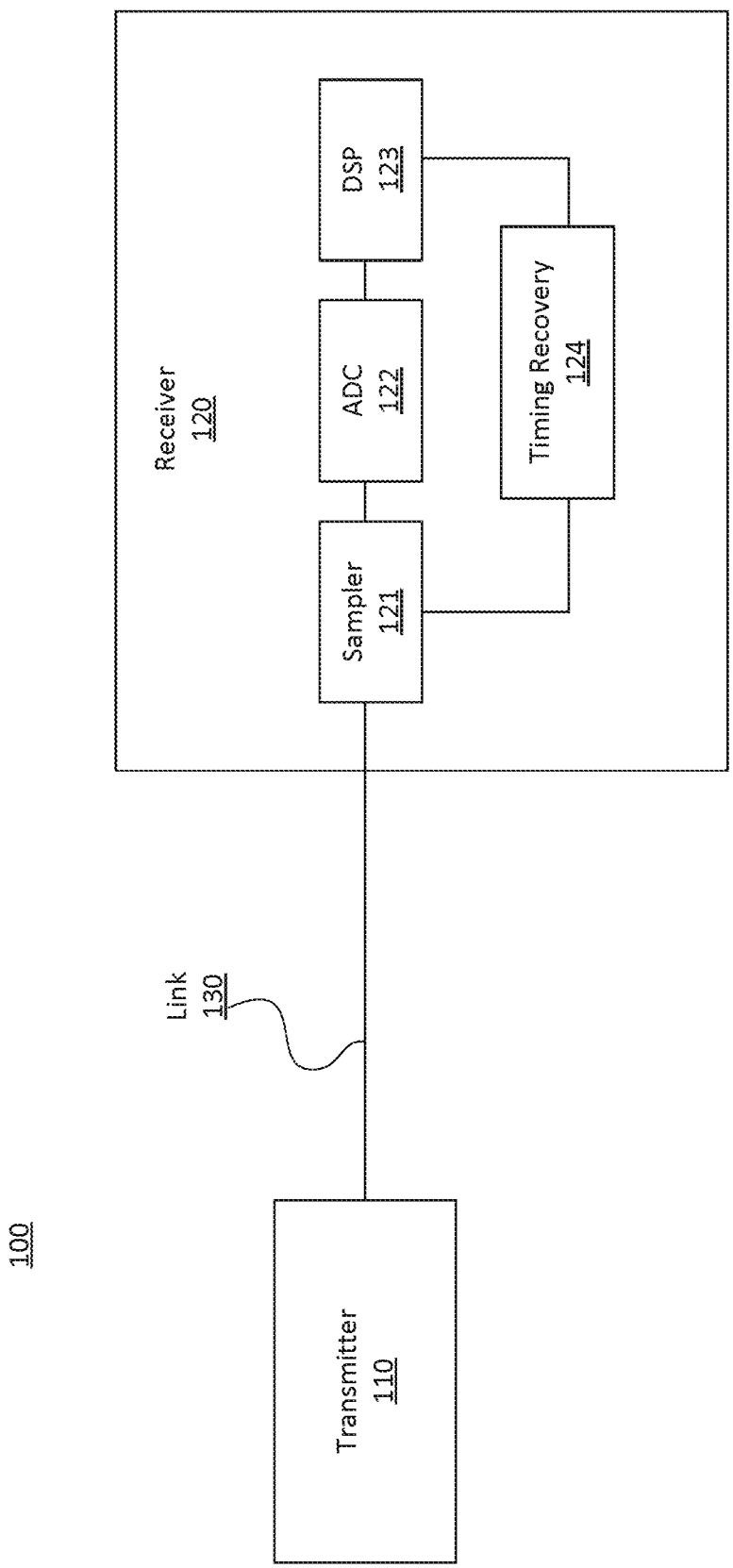
FIG. 1 is a simplified diagram illustrating a communication system according to embodiments of the present invention.

The present invention is directed to circuits and communication. More specifically, a specific embodiment of the present invention provides a timing recovery device with two stages. The first stage adjusts a clock signal, and the second stage provides further jitter mitigation by increasing the overall timing recovery tracking bandwidth. The second stage includes a jitter mitigation circuit, an error generator, a timing error detector and a tracking loop filter to reduce jitters associated with the clock signal. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a communication system according to embodiments of the present invention. This diagram is merely an example, which should not unduly limit the scope of the claims. One of ordinary skill in the art would recognize many variations, alternatives, and modifications. Communication system 100 includes transmitter 110, receiver 120, and link 130. Transmitter 110 transmits data to receiver 120 via communication link 130. Receiver 120 includes sampler 121, analog to digital converter (ADC) 122, digital signal processor (123), and timing recovery module 124. It is to be understood that receiver 120 as shown merely provides an example and includes additional components (e.g., receiver interface, equalizer, variable gain amplifier, reference clock, etc.) and may have different configurations. Sampler 121 samples analog data received via communication link 130. Sampler 121, as shown, also connects to timing recovery module 124. The ADC 122 converts sampled analog data to digital format. The DSP 123 further processes the received data-now in digital format after conversion by ADC 122. For example, DSP 123 may be configured to perform equalization, detection, error correction, and other processes. The output of DSP 123 is provided to timing recovery module 124, which extract timing information (e.g., clock signal). As an example, timing recovery module 124 is implemented according to embodiments of the present invention, and it comprises two stages that allow for a high level of performance. Timing recovery module 124 includes a first stage circuit and a second stage circuit. The first stage circuit is configured to adjust clock rate. The second stage circuit is configured to compensate for jitter in the clock.

Timing information, extracted by timing recovery module 124, is important for data processing, as receiver 120 relies on the timing information to sample the received data. Regardless of whether link 130 is wired, wireless, or optical, timing recovery is essential, and the performance of the timing recovery mechanism directly affects the performance and reliability of data communication and data processing systems. For example, serializer/deserializer (SerDes), transceivers, data management systems, and other device are implemented with various types of timing recovery mechanisms. In some embodiments, timing recovery mechanisms according to the present invention are used in communication systems that use pulse amplitude modulation (PAM) signaling.

There are many considerations in digital timing recovery design. The performance of a digital timing recovery mechanism mainly depends on (or is limited by) loop latency and the signal to noise ratio (SNR) of the timing-error detector. It is to be appreciated that embodiments of the present invention address these mechanisms and take other considerations into account as well. In certain scenarios, the timing recovery process enables reliable communication with non-compliant transmitters. For example, a non-compliant transmitter may have jitters beyond the achievable bandwidth of a conventional timing recovery loop, and to address this problem, the jitter-tracking performance needs to be improved. Additionally, in a digital timing recovery scheme that closes timing at the analog sampling circuit, decreasing loop latency increases power consumption and/or decreases timing SNR. It is therefore to be appreciated that the present invention, in various embodiments, improves various aspects of timing recovery mechanisms that can be used in many applications.

Figure 2:
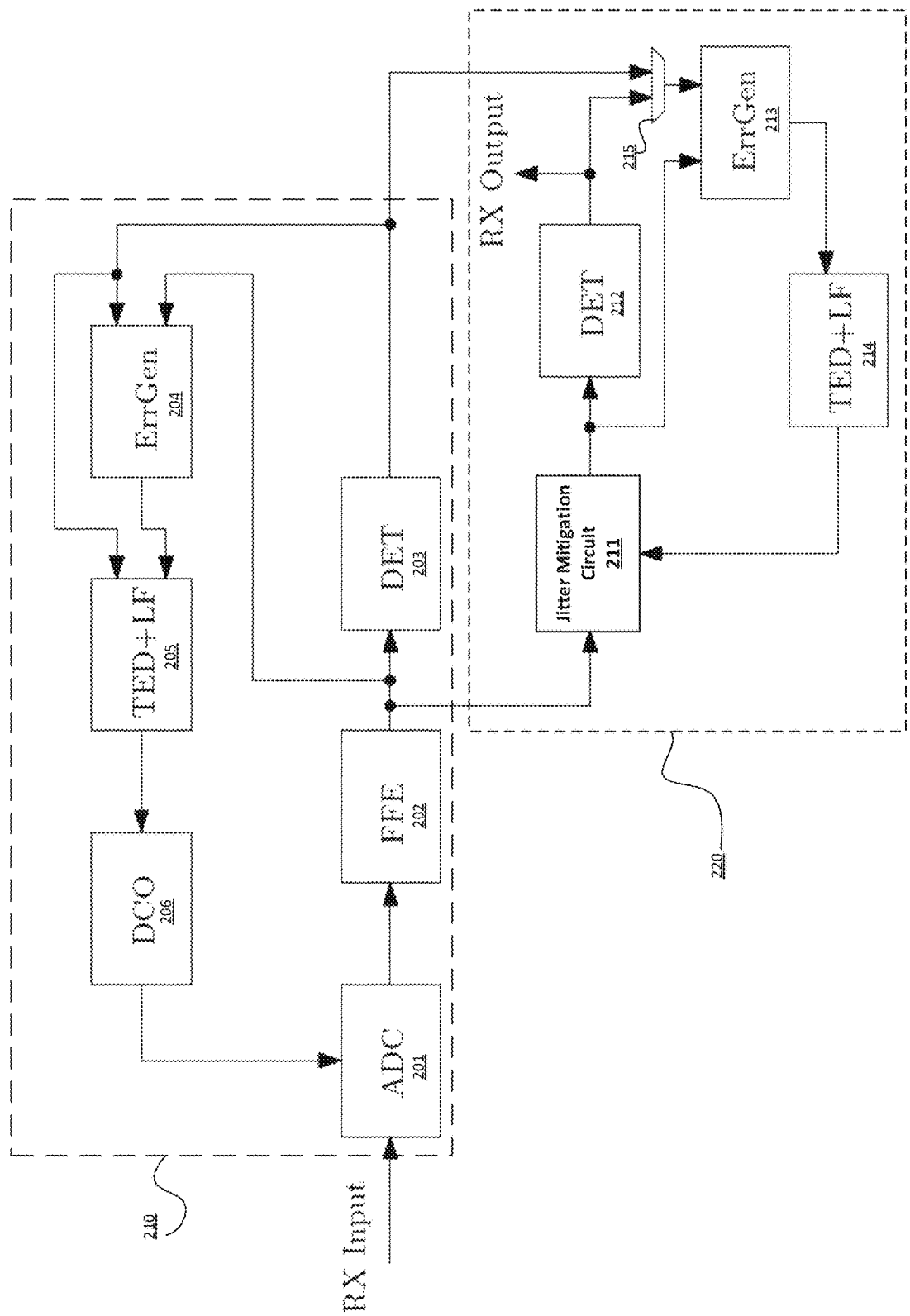
FIG. 2 is a simplified block diagram illustrating a timing recovery device 200 according to an embodiment of the present invention.

FIG. 2 is a simplified block diagram illustrating a timing recovery device 200 according to an embodiment of the present invention. This diagram is merely an example, which should not unduly limit the scope of the claims. One of ordinary skill in the art would recognize many variations, alternatives, and modifications. As an example, timing recovery device 200 can be implemented as block 124 in FIG. 1. Timing recovery device 200 includes a first stage circuit 210 and a second stage circuit 220. The first stage circuit 210 generates a recovered clock signal based on the received samples and adjusts the sampling clock frequency. The second stage circuit 220 detects and mitigates timing jitter.

In timing recovery processes, untracked jitter induces timing-phase-error dependent intersymbol interference (ISI). While ISI can be compensated by a finite impulse response (FIR) filter, the tap amplitudes of the jitter mitigation circuit need to reflect the instantaneous residual jitter, which means that the jitter needs to be tracked. The second stage circuit 220 of the timing recovery device 200 compensates residual jitter less than 1 unit interval (UI) peak-to-peak in amplitude, and jitter compensation efficiency decreases as timing-phase error increases.

The timing recovery process starts with the sampled data, as received and processed by ADC 201. For example, the sampled data is generated by a sampler (e.g., sampler 121 in FIG. 1, not shown in FIG. 2) based on a received data stream. ADC 201 digitizes the sampled data by performing analog to digital conversion process at a clock rate (typically at the receiving baud rate), which is adjusted by the timing correction signal received by the digitally controlled oscillator (DCO) 206. The feedforward equalizer (FFE) 202 equalizes the channel. Depending on the implementation, other types of equalizations may be performed as well.

The equalized data, provided by FFE 202, are processed by detector (DET) 203, which may be implemented with different types of mechanisms. For example, DET 203 may be implemented using a slicer, a decision feedback equalizer (DFE), a maximum likelihood sequence detector (MLSD), and/or other types of mechanisms. In a specific embodiment, DET 203 is implemented with a DFE that implements a first post-cursor tap and includes a slicer. An MLSD-based DET may also be implemented with, among other components, a slicer.

Error generator (ErrGen) 204 uses outputs of both FFE 202 and DET 203 as shown. For an ISI detector (e.g., DFE, MLSE), error generator 204 uses the slicer decisions from DET 203 to remove the (decision-dependent) cursor and ISI terms from the FFE output. When the DET 203 is implemented simply with a slicer, error generator 204 removes the decision-dependent cursor contribution from the FFE output.

Block 205 includes a timing error detector (TED) and a loop filter (LF). The TED uses the outputs of error generator 204 and DET 203 to generate an indication of whether the sampling process is early or late. The LF filters the TED output in order to generate a signal that controls the frequency of the clock generated by the DCO 206.

The performance of first stage circuit 210 is limited by, among other things, its loop latency. To provide an improvement in jitter tracking bandwidth, the latency of the second stage circuit 220 as implemented is much smaller than that of the first stage circuit 210. For example, the latency of first stage circuit 210 can be described as the total latency of its components (e.g., ADC, FFE, DET, ErrGen, TED, LF and DCO), which is larger than the total latency of the components in the second stage circuit 220. The first stage circuit 210, due to its latency limitations, cannot provide adequate jitter tracking bandwidth for some applications. It is to be appreciated that second stage circuit 220, optimized for both latency and accuracy, is effective in removing residual timing jitter from first stage circuit 210.

In certain embodiments, interference and/or reflection cancellation functions (not shown) are integrated with the jitter mitigation circuit 211 into a single impairment-mitigation block. To avoid increasing loop latency, these added functions, such as interference and reflection cancelation, can be performed prior to (or in parallel with) the jitter mitigation circuit.

As shown in FIG. 2, the connection between first stage circuit 210 and second stage circuit 220 is implemented by the connection between FFE 202 and jitter mitigation circuit 211. More specifically, jitter mitigation circuit 211 performs jitter mitigation process using the FFE 202 output (i.e., equalized sampled data). In a specific embodiment, jitter mitigation circuit 211 is a look-up table indexed by the equalizer output. Second stage circuit 220 includes jitter mitigation circuit 211, DET 212, error generator 213, and block 214. In a specific embodiment, block 214 is omitted, and the output of block 205 is used instead as input to jitter mitigation circuit 211. It is to be appreciated that blocks 212-214 may be similar to corresponding blocks of first stage 210, but they are implemented specifically for second stage circuit 220 and configured for jitter mitigation function. The output of the second stage circuit 220 is provided by DET 212. DET 212 provides improved error correction performance, but when included in the jitter tracking control loop it introduces additional latency. In some embodiments, the selector 215 is configured to select the values from DET 203, which can translate to increased tracking bandwidth and stability with a relatively small cost of lowered accuracy. In certain applications, second stage circuit 220 can be bypassed altogether (e.g., to conserve power, reduce latency, etc.). For example, a control module (not shown in FIG. 2) can turn the second stage circuit 220 on and off as needed. In various embodiments, the condition for turning off or bypassing the second stage circuit 220 includes power consumption, jitter level being lower than a predetermined threshold, etc.

In FIG. 2, error generator 213 receives inputs from jitter mitigation circuit 211 in addition to inputs from either DET 203 or DET 212. When error generator 213 is configured to receive inputs from DET 203, the jitter tracking loop latency is minimized, which increases the achievable jitter tracking bandwidth of the second stage 220. Specific functions and configurations of error generator 213 are described in further detail below.

Figure 3:
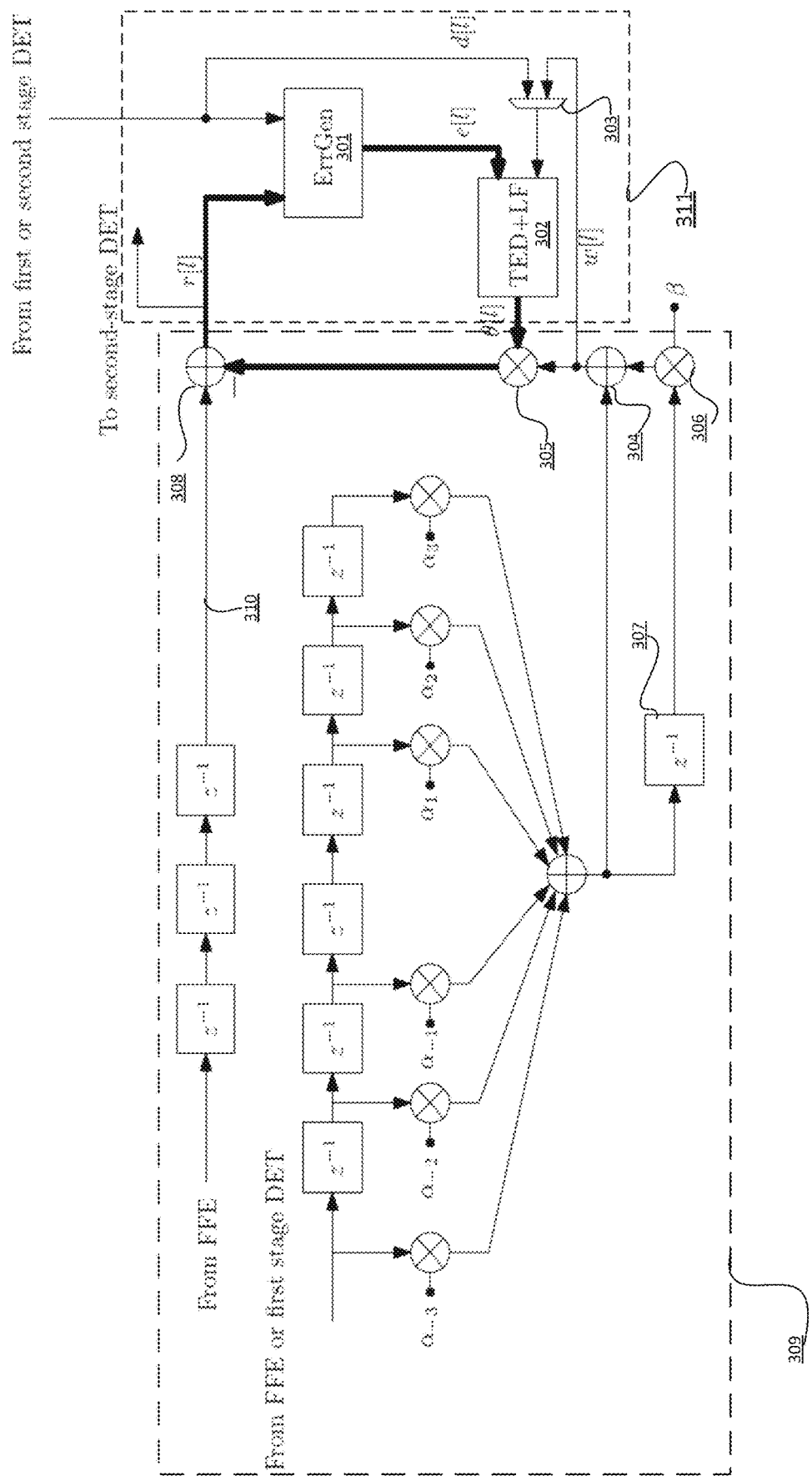
FIG. 3 is a simplified block diagram illustrating jitter mitigation mechanism 300 for timing recovery according to embodiments of the present invention FIGS. 4A and 4B provide plots illustrating genie-aided performance of jitter mitigation according to embodiments of the present invention.

FIG. 3 is a simplified block diagram illustrating jitter mitigation mechanism 300 for timing recovery according to embodiments of the present invention. This diagram is merely an example, which should not unduly limit the scope of the claims. One of ordinary skill in the art would recognize many variations, alternatives, and modifications. As an example, jitter mitigation mechanism 300 is implemented as the second stage circuit 220 of timing recovery device 200.

Jitter mitigation mechanism 300 includes a jitter estimation circuit 311 and jitter mitigation circuit 309, which is expanded from FIG. 2 to provide an exemplary implementation. Jitter mitigation circuit 309 includes a 7-tap linearized implementation of an FIR filter, with tap amplitudes that depend on an estimate of the instantaneous jitter. The three post-cursor and three pre-cursor taps have fixed coefficient multipliers (i.e., $\alpha_{-3}$ to $\alpha_3$), and their summed output is scaled by an estimate of the instantaneous jitter $\theta[l]$ at node 305, such that the effective non-cursor FIR taps weights are $\alpha_i \cdot \theta[l]$. To account for the contribution of a non-zero first post-cursor in the equalized response, node 306 multiplies a delayed summing node output by the DFE tap amplitude $\beta$. The cursor tap is unity gain, and the cursor input is combined with the output of node 305 to generate the jitter-mitigated output. The inputs to the cursor tap are the FFE outputs. Depending on the application, the inputs to the non-cursor taps are either the FFE outputs or the first stage detector outputs. Depending on the implementation, the number of taps in filter 309 may vary. The number of taps affect, among other things, power consumption and performance. In this exemplary implementation, the jitter tracking loop only needs to be closed at node 305 (which implements the multiplication by $\theta$), and thus contributes to low loop latency.

In certain embodiments, fewer taps (e.g., three or five taps) are used as the insertion loss of the channel decreases. At startup, the set of coefficients can be selected based on the FFE and DFE coefficients. The error generator 301, as shown, receives the value calculated at node 308. Node 308 provides the output r[l] of jitter mitigation circuit 309 that is the difference between value provided at line 310 and the value of node 305. Additionally, error generator 301 also uses the output of a DET block, which could be the second stage DET (e.g., block 212 in FIG. 2) or the first stage DET (e.g., block 203 in FIG. 2) as its input. For example, the output e[l] of error generator, when operating in an FFE-only mode (i.e., DET is PAM slicer; $\beta=0$), is:

$$e[l]=r[l]-d[l]$$

where r[l] is the output of the jitter mitigation FIR, and d[l] is the PAM level corresponding to the DET output. Otherwise, the output e[l] of the error generator 301, when $\beta \neq 0$, is:

$$e[l]=r[l]-(d[l]+\beta \cdot d[l-1])$$

The output e[l] of error generator 301 is processed at block 302, which includes a TED and an LF as shown. Block 302 is coupled to selector 303, which selects between the value at node 304 and DET signal d[l]. Depending on the implementation, the TED used in the second stage (e.g., block 214 in FIG. 2) does not need to be the same as the type of TED used in the first stage (e.g., block 205 in FIG. 2). TED in block 302 can be implemented in various ways, such as zero-forcing (ZF) TED and minimum mean-square error (MMSE) TED. The output T[l] of a zero-forcing TED, where d[l] is the PAM level corresponding to the DET, can be described as:

$$T[l]=e[l] \cdot (d[l+1]-d[l-1])$$

The output T[l] of an MMSE TED—where e[l] is the output of the error generator, and w[l] is the output from the non-cursor taps of the jitter mitigation FIR filter (immediately prior to its multiplication by $\theta$)—is:

$$T[l]=e[l] \cdot w[l],$$

A loop filter (LF) is implemented as a part of block 302, along with the TED. In various embodiments, the loop filter output $\theta$ is the integral of some function $q(\cdot)$ of the TED output:

$$\theta[l]=\theta[l-1]+\mu \cdot q(T(l))$$

For example, the LF is implemented using a proportional controller, and the LF output is:

$$\theta[l]=[l-1]+k_p \cdot T(l)$$

As another example, the LF is implemented using a proportional-integral controller, and its output is:

$$\theta[l]=\theta[l-1]+\mu \cdot (T(l)+U[l])$$

where $$U[l]=U[l-1]+\mu_I \cdot T(l)$$

There are two primary factors affecting the overall jitter mitigation performance. The first is the jitter tracking control loop, that is, how well $\theta[l]$ tracks the residual timing jitter. The second is the jitter compensation data path equalizer, which determines how well the jitter mitigation FIR filter compensates residual ISI due to timing jitter.

Figure 4A:
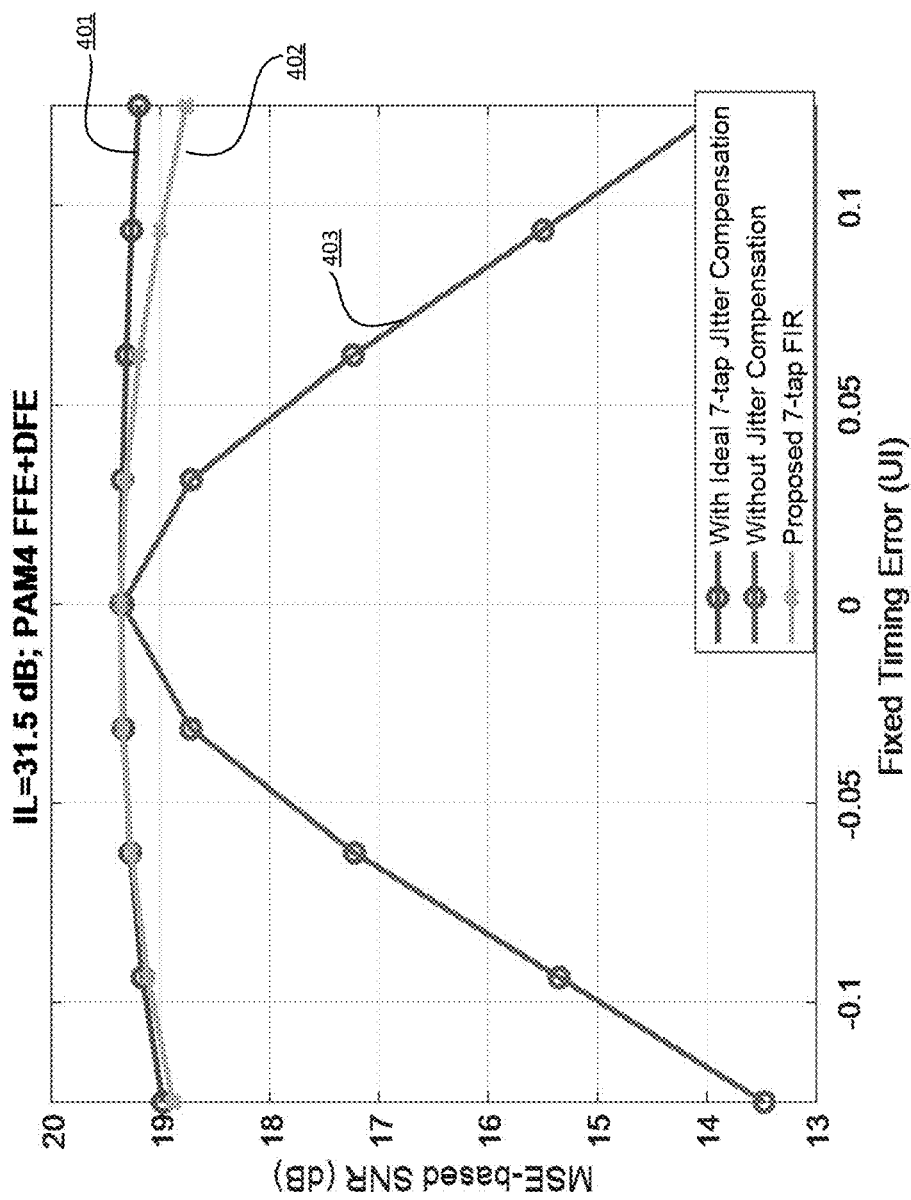
Figure 4B:
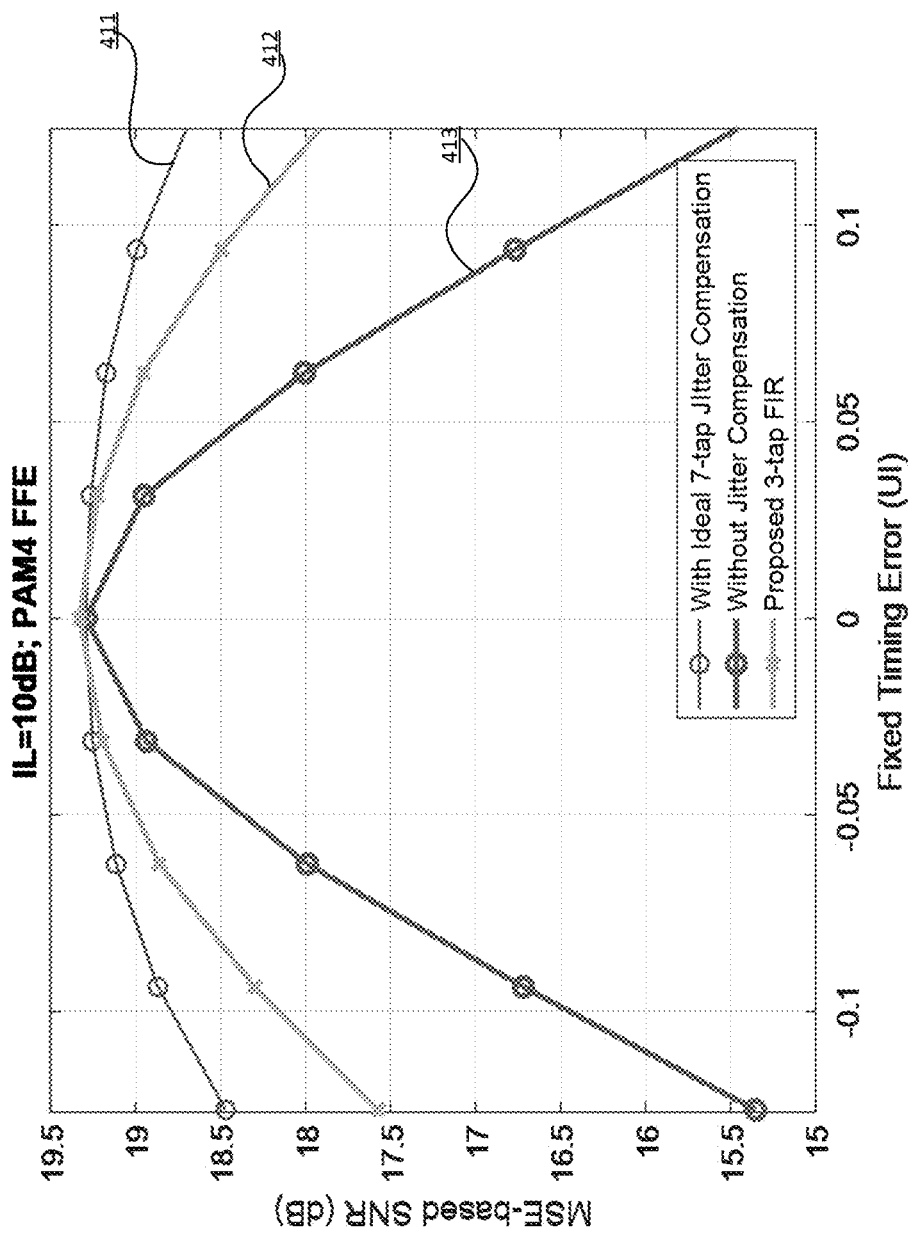

FIGS. 4A and 4B provide plots illustrating genie-aided performance of jitter mitigation according to embodiments of the present invention. This diagram is merely an example, which should not unduly limit the scope of the claims. One of ordinary skill in the art would recognize many variations, alternatives, and modifications. The genie-aided performance assumes that the residual timing jitter is static but perfectly known (e.g., genie-aided jitter tracking control loop). As the insertion loss (IL) increases, the penalty in the absence of jitter compensation increases, but the penalty with compensation decreases. FIG. 4A shows performance of a PAM4 configuration with FFE and DFE. FIG. 4B shows performance of a PAM4 configuration with FFE.

Figure 5A:
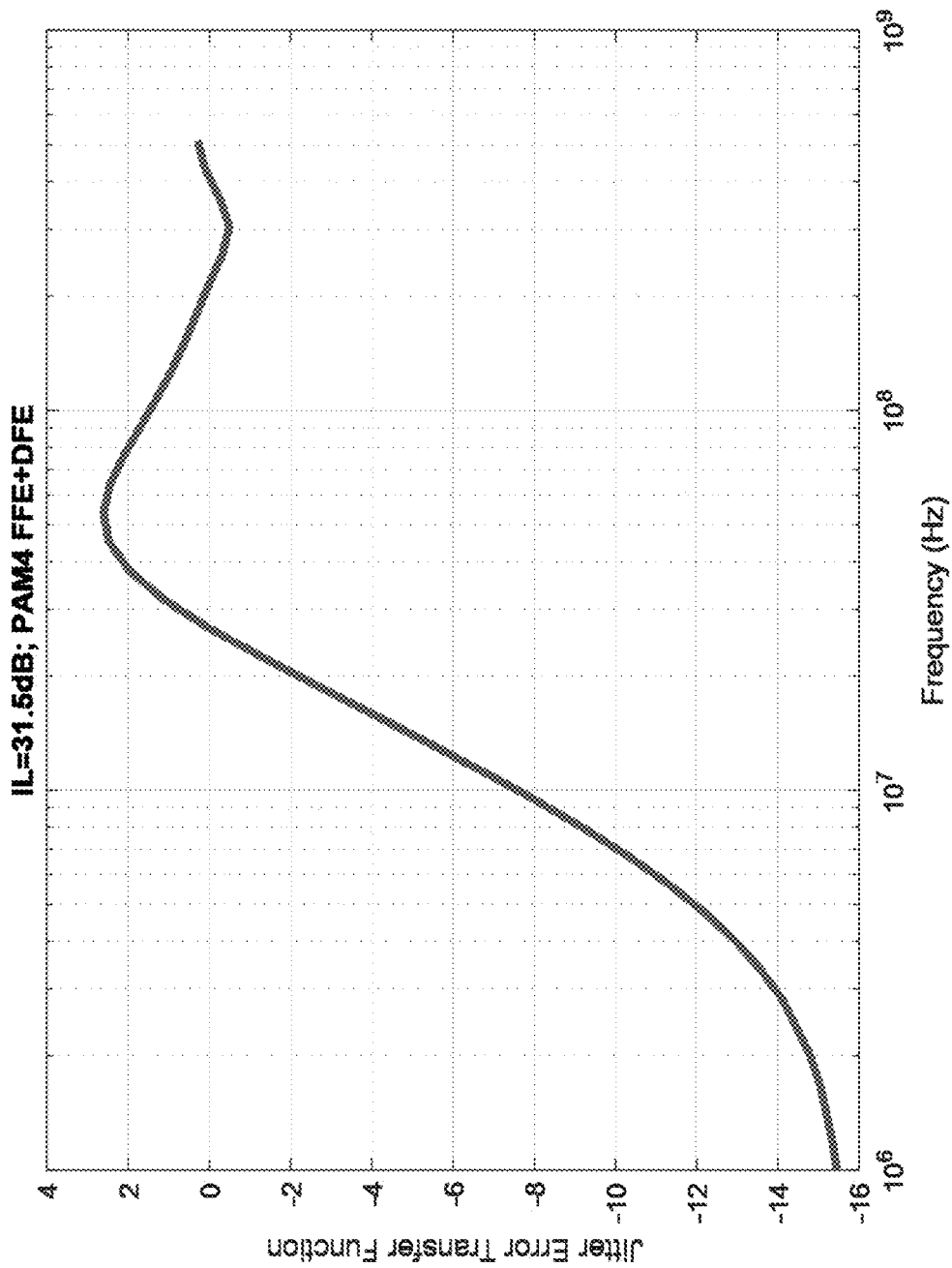
FIGS. 5A and 5B provide plots illustrating simulated performance of jitter mitigation (with FFE and DFE) according to embodiments of the present invention.
Figure 5B:
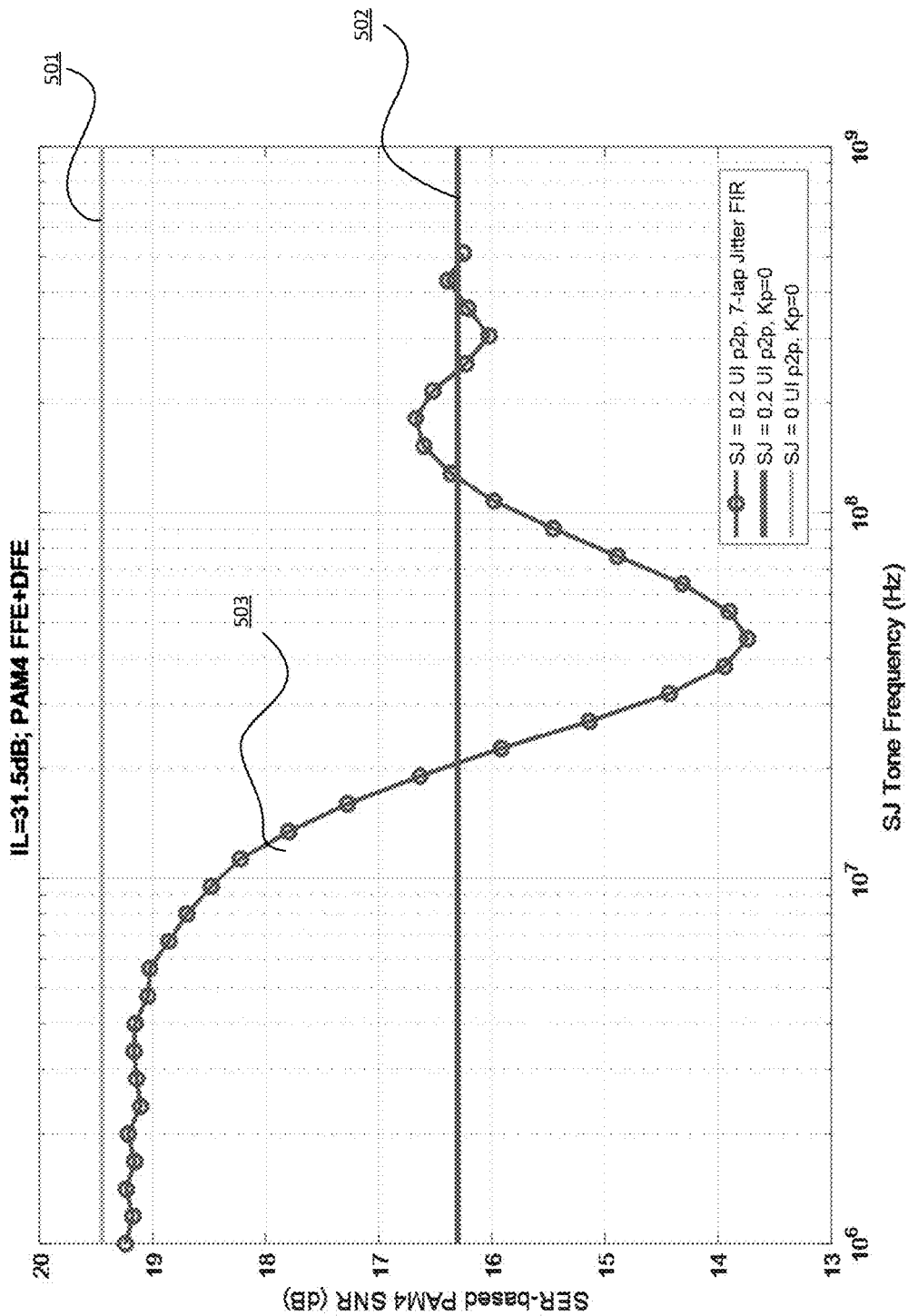

FIGS. 5A and 5B provide plots illustrating simulated performance of jitter mitigation (with FFE and DFE) according to embodiments of the present invention. This diagram is merely an example, which should not unduly limit the scope of the claims. One of ordinary skill in the art would recognize many variations, alternatives, and modifications. The simulation corresponds to a condition of 3 dB jitter rejection at 18 MHz and less than 2.6 dB of peaking (zero peaking prior to 27 MHz). For SJ=0.2 UI peak-to-peak (p2p) at 8 MHz, less than 0.75 dB of degradation relative to baseline SNR. FIG. 5A shows jitter error transfer functions. FIG. 5B shows SER-based PAM4 SNR. To compare the three plots in FIG. 5B, plot 501 corresponds to SJ=0 UI p2p, and $K_p$=0; plot 502 corresponds to SJ=0.2 UI p2p, $K_p$=0; and plot 503 corresponds to SJ=0.2 UI p2p, with 7-tap jitter FIR.

Figure 6A:
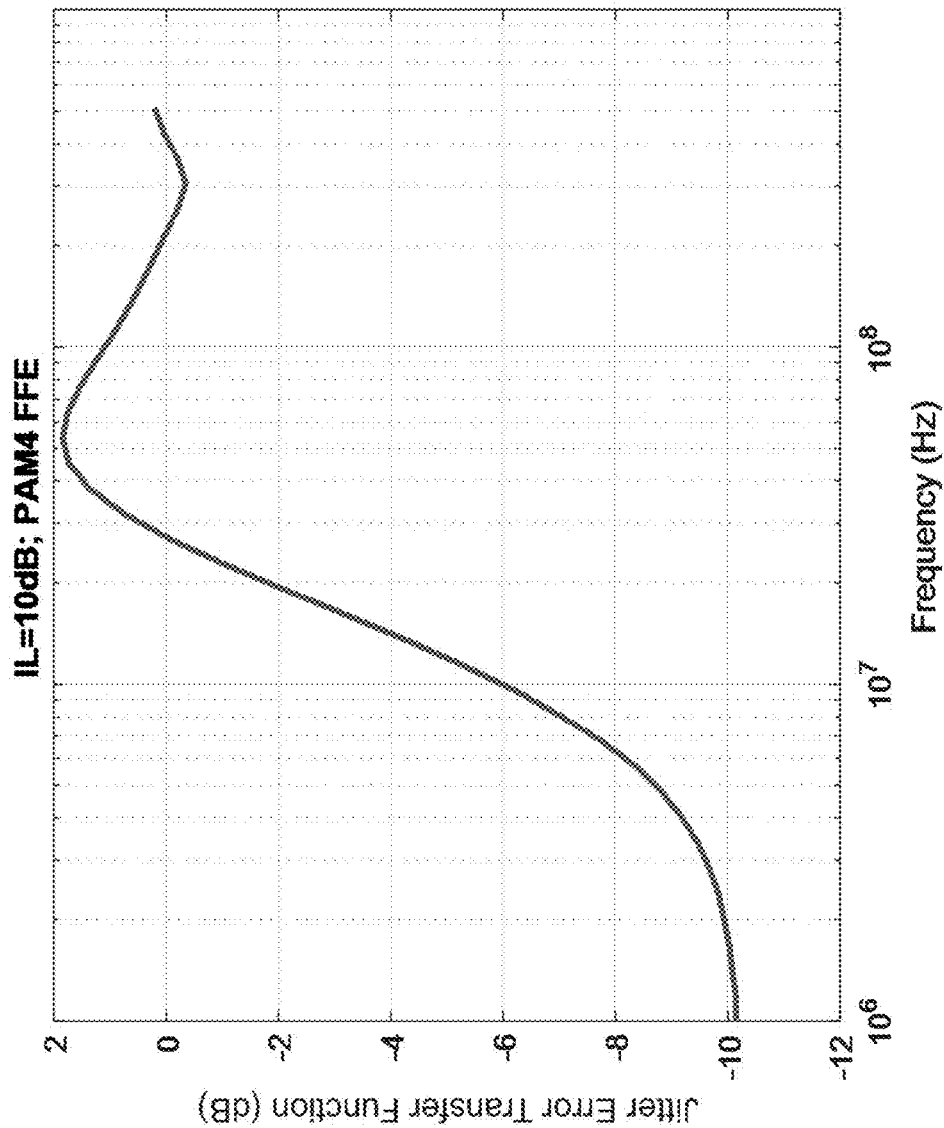
FIGS. 6A and 6B provide plots illustrating simulated performance of jitter mitigation (with FFE) according to embodiments of the present invention.
Figure 6B:
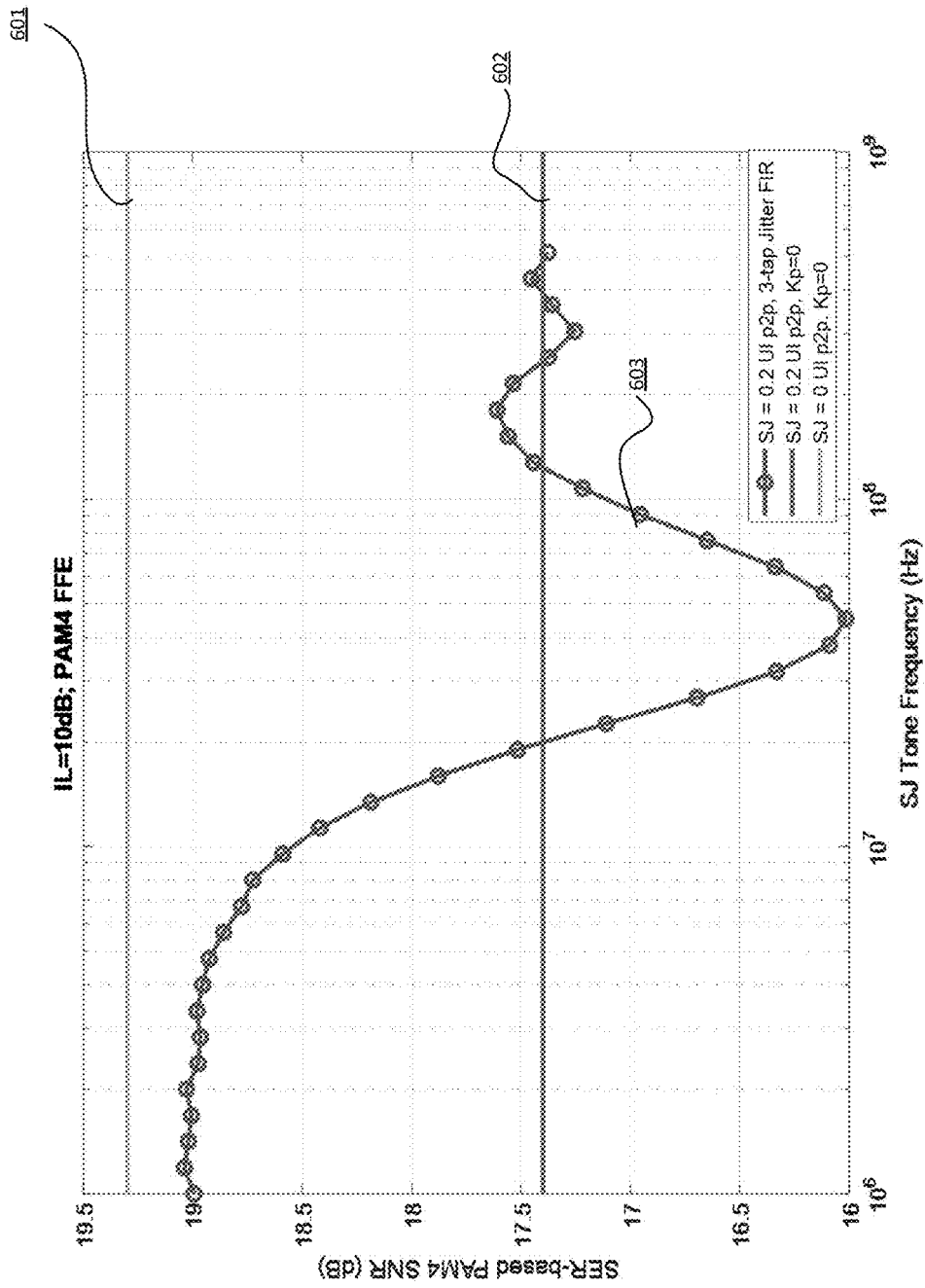

FIGS. 6A and 6B provide plots illustrating simulated performance of jitter mitigation (with FFE) according to embodiments of the present invention. This diagram is merely an example, which should not unduly limit the scope of the claims. One of ordinary skill in the art would recognize many variations, alternatives, and modifications. The simulation corresponds to 3 dB jitter rejection at 16.5 MHz, with less than 1.9 dB of peaking (zero peaking prior to 27 MHz). For SJ=0.2 UI p2p @ 8 MHz, less than 0.6 dB of degradation relative to baseline SNR. FIG. 6A shows jitter error transfer function measured in dB. FIG. 6B shows SER-based PAM4 SNR measured in dB. To compare the three plots in FIG. 6B, plot 601 corresponds to SJ=0 UI p2p, and $K_p$=0; plot 602 corresponds to SJ=0.2 UI p2p, $K_p$=0; and plot 603 corresponds to SJ=0.2 UI p2p, with 3-tap jitter FIR.

In addition to the performance benefits, as illustrated in plots, timing recovery mechanisms according to the present invention also provide implementational advantages. For example, the jitter mitigation circuit and the second stage of a timing recovery device can be configured for modular implementation, thus allowing them to be incorporated into various systems and apparatus. In various implementations, timing recovery mechanisms according to the present invention extend timing recovery bandwidth to over 15 MHz without adding to the design requirements of other elements in the receiver (e.g., latency of existing receiver elements). Implemented in conjunction with the first stage timing recovery, the second stage timing recovery detects the residual jitter after the first-stage timing recovery. To obtain optimal overall performance, the peaking and bandwidth of the first stage are optimized with respect to the peaking and bandwidth of the second stage.

Figure 7:
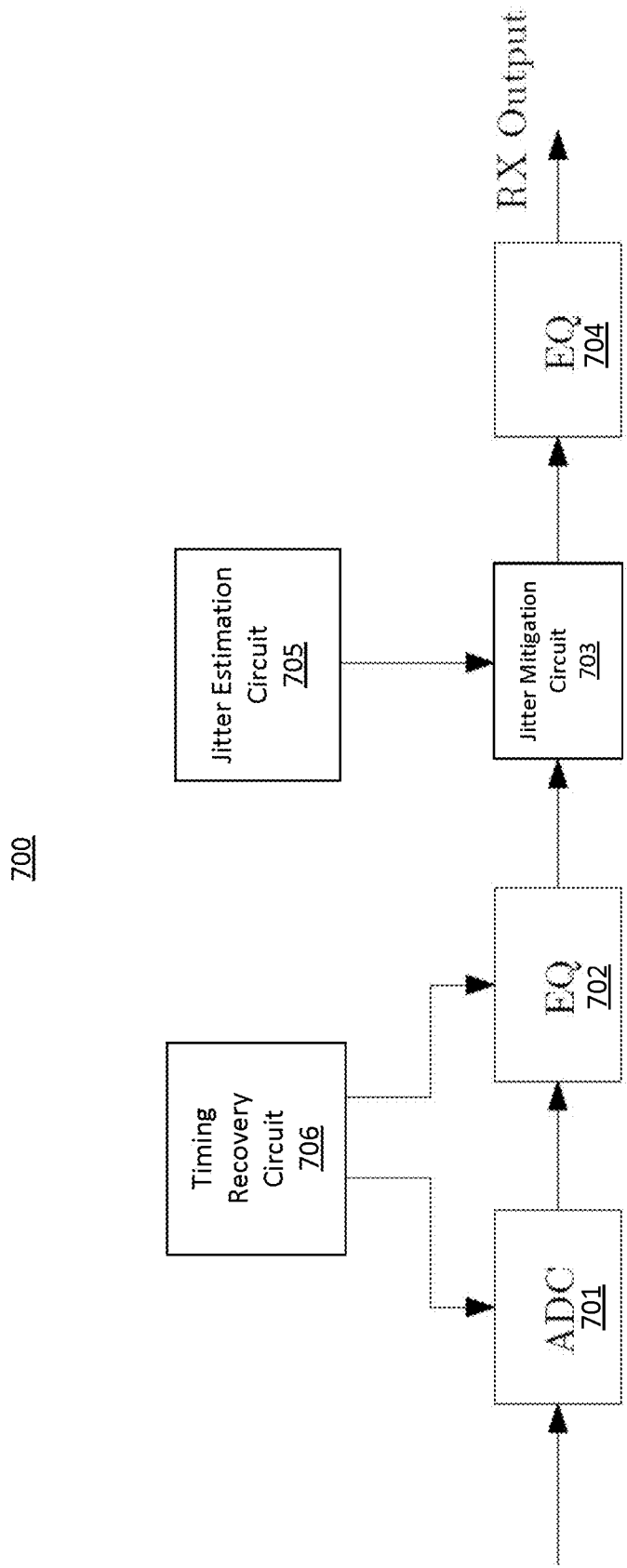
FIG. 7 is a simplified block diagram illustrating a two-stage timing recovery device according to embodiments of the present invention.

FIG. 7 is a simplified block diagram illustrating a two-stage timing recovery device according to embodiments of the present invention. This diagram is merely an example, which should not unduly limit the scope of the claims. One of ordinary skill in the art would recognize many variations, alternatives, and modifications. Timing recovery device 700 includes an ADC 701 that digitizes received data signals at a recovered clock rate provided by timing recovery circuit 706. The digitized data is equalized by equalizer 702. Timing recovery circuit 702 determines the recovery clock rate by processing the equalized data provided by equalizer. Timing recovery circuit 706 is able to adjust clock rate and provide limited jitter reduction, but its bandwidth is limited by, among other things, its latency. As an example, timing recovery circuit 706 includes components such as DCO, TED, LF, detector, error generator, and/or detector. Jitter mitigation circuit 703 processes the equalized digital data provided by equalizer 702 and reduces jitters, using error estimation provided by jitter estimation circuit 705. For example, jitter estimation circuit 705 may be implemented with detector, error generator, TED, LF, and/or other components. One or more components of jitter estimation circuit 705 may be shared with the timing recovery circuit 706. In some embodiments, jitter estimation circuit 705 does not have its own detector or TED, but uses the output of timing recovery circuit's detector or TED. Jitter mitigation circuit 703 can be implemented, for example, using an FIR filter. In certain embodiments, jitter mitigation circuit 703 comprises a lookup table that is indexed by the output of equalizer 702. The output of jitter mitigation circuit 703 is equalized by equalizer 704, which provides a receiver output (RX Output).

Figure 8:
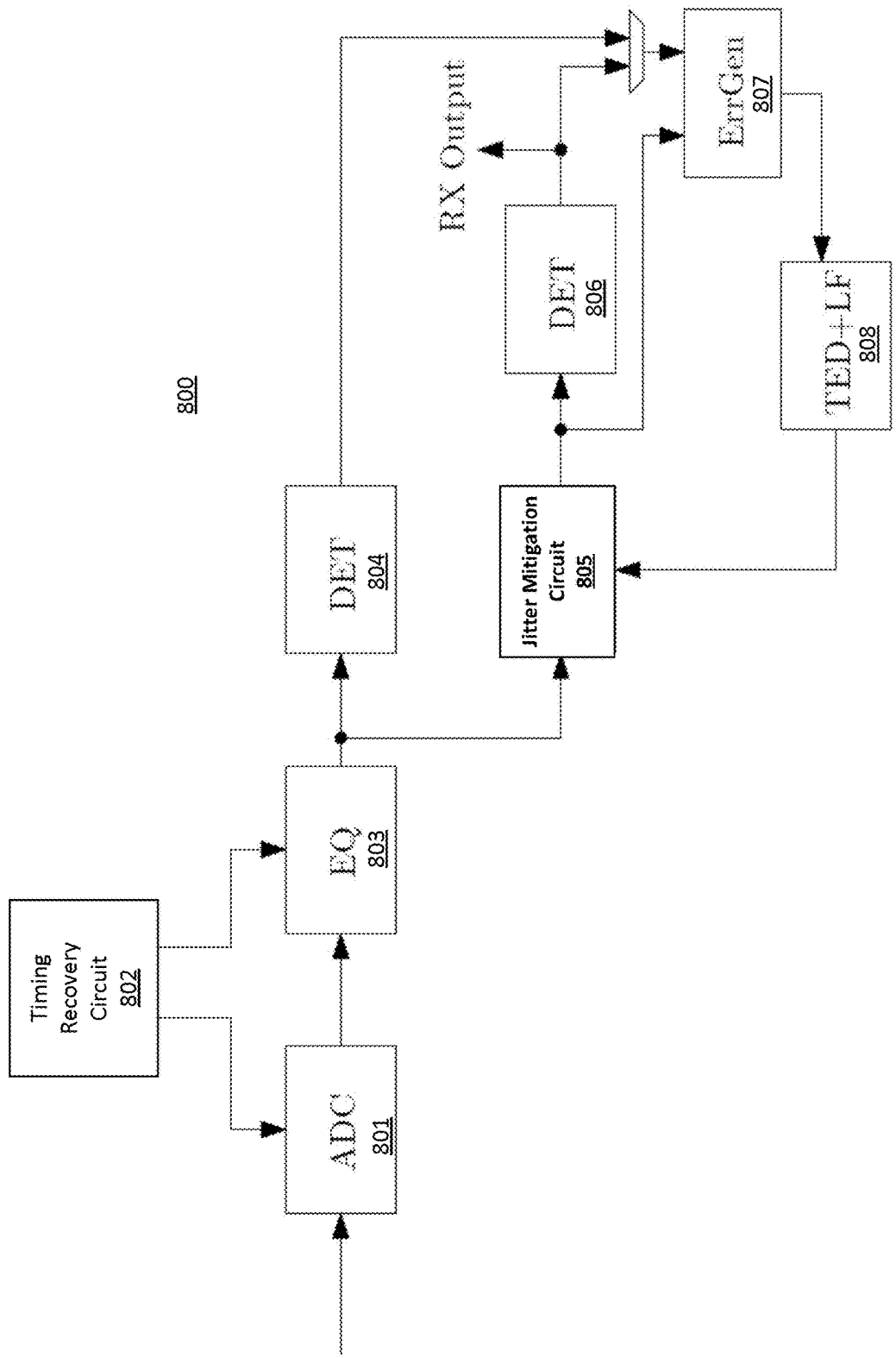
FIG. 8 is a simplified block diagram illustrating a two-stage timing recovery device according to embodiments of the present invention.

FIG. 8 is a simplified block diagram illustrating a two-stage timing recovery device according to embodiments of the present invention. This diagram is merely an example, which should not unduly limit the scope of the claims. One of ordinary skill in the art would recognize many variations, alternatives, and modifications. This diagram is merely an example, which should not unduly limit the scope of the claims. One of ordinary skill in the art would recognize many variations, alternatives, and modifications. Timing recovery device 800 includes an ADC 801 that digitizes received data signals at a recovered clock rate provided by timing recovery circuit 806. The digitized data is equalized by equalizer 803. For example, equalizer 803 is implemented with an FFE. Timing recovery circuit 802 determines the recovered clock rate by processing the equalized data provided by equalizer. Timing recovery circuit 802 is able to adjust clock rate and provide limited jitter reduction, but its bandwidth is limited by, among other things, its latency. As an example, timing circuit 802 includes components such as DCO, TED, LF, detector, error generator, and/or detector. For example, detector 804 may be implemented as a part of timing recovery circuit 802. Jitter mitigation circuit 805 processes the equalized digital data provided by equalizer 803 and reduces jitters. Error generator 807 selects between detector 804 and detector 806 as its input to generate an error signal, which is used by block 808 to generate a timing error signal. Block 808 includes TED and LF. Jitter mitigation circuit 805 can be implemented, for example, using an FIR filter. In certain embodiments, jitter mitigation circuit 805 comprises a lookup table that is indexed by the output of equalizer 803. The output (RX Output) of timing recovery device 800 is coupled to output of detector 806 as shown.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A timing recovery apparatus comprising:
   a first stage circuit comprising:
      an analog-to-digital converter (ADC), an equalizer, and an oscillator; the ADC being configured to digitize a data stream using a sampler triggered by a recovered clock signal and to adjust an operating frequency based on a timing correction signal generated by the oscillator, the recovered clock signal being impaired by a residual timing jitter; and the equalizer being configured to provide equalized data based on an output of the ADC; and
   a second stage circuit comprising:
      a jitter mitigation circuit coupled to the equalizer and configured to compensate for timing-jitter-induced inter-symbol interference (ISI) in an equalizer output, the jitter mitigation circuit having coefficients associated with an estimate of the residual timing jitter; and
      a jitter estimation circuit configured to determine the residual timing jitter, the jitter estimation circuit comprising:
         an error generator configured to generate an error signal based at least on a detector output signal;
         a timing error detector (TED) configured to generate a timing error signal based at least on the error signal;
         a selector coupled to the TED, the selector being coupled to an intermediate output of the jitter mitigation circuit and a data detector signal; and
         a loop filter configured to generate the estimate of the residual timing jitter based on the timing error signal.

2. The apparatus of claim 1 wherein the timing error detector (TED) comprises a zero-forcing TED.

3. The apparatus of claim 1 wherein the equalizer comprises a feedforward equalizer.

4. The apparatus of claim 1 wherein the first stage circuit further comprises a detector configured to generate the data detector signal.

5. The apparatus of claim 1 wherein:
the first stage circuit further comprises a first detector coupled to the equalizer to process the equalized data; and
the second stage circuit further comprises a second detector configured to process an output signal of the jitter mitigation circuit.

6. The apparatus of claim 1 wherein the error generator is configured to generate the error signal based on an output of the jitter mitigation circuit and the detector output signal.

7. The apparatus of claim 1 wherein the jitter mitigation circuit comprises a finite impulse response filter.

8. The apparatus of claim 1 wherein the jitter mitigation circuit comprises a look-up table indexed by the equalizer output.

9. The apparatus of claim 1 wherein the first stage circuit comprises a detector configured to process the equalized data and generate a first output wherein:
the error generator is configured to receive the equalized data and the first output, to process the equalized data based on the first output, and to generate a second output;
the timing error detector is configured (i) to receive the first output and the second output, and (ii) to generate a third output indicative of a sampling rate; and
the oscillator is configured (i) to receive the third output, and (ii) to adjust the operating frequency of the ADC based on the third output.

10. A circuit for jitter mitigation and timing recovery, the circuit comprising:
a jitter mitigation circuit coupled to an equalizer to compensate for timing-jitter-induced inter-symbol interference (ISI) in an equalizer output, the jitter mitigation circuit comprising a finite impulse response filter with taps that depend on an estimate of a residual timing jitter, the estimate of the residual timing jitter being provided by a jitter tracking loop;
an error generator configured to generate an error signal based on an output of the jitter mitigation circuit and a detector output signal;
a timing error detector (TED) configured to generate a timing error signal;
a selector coupled to the TED, the selector being coupled to an intermediate output of the jitter mitigation circuit and a data detector signal; and
a loop filter configured to generate the estimate of the residual timing jitter based on the timing error signal.

11. The circuit of claim 10 further comprising a detector for generating the detector output signal.

12. The circuit of claim 10 wherein the jitter mitigation circuit is coupled to a receiver with an integrated timing recovery circuit.

13. The circuit of claim 10 wherein the jitter mitigation circuit processes the output of a feedforward equalizer from a receiver with an integrated timing recovery circuit.

14. The circuit of claim 10 wherein the error generator receives the data detector signal from a data detector of a receiver with an integrated timing recovery circuit.

15. The circuit of claim 10 wherein the equalizer comprises a feedforward equalizer.

16. A receiver apparatus comprising:
an interface for receiving a data stream; and
a timing recovery module comprising a first stage circuit and a second stage circuit;
wherein:
the first stage circuit comprises:
an analog-to-digital converter (ADC), the ADC being configured to digitize the data stream using a recovered clock signal, the recovered clock signal being impaired by residual timing jitter,
an equalizer configured to provide equalized data based on an output of the ADC; and
the second stage circuit comprising a jitter mitigation circuit coupled to the equalizer and configured to compensate for timing-jitter-induced inter-symbol interference (ISI) in an equalizer output, the jitter mitigation circuit comprising a finite impulse response filter with taps that depend on an estimate of a residual timing jitter, the estimate of the residual timing jitter being provided by a jitter tracking loop, the jitter mitigation circuit comprising a selector coupled to an intermediate output of the jitter mitigation circuit and a detector signal.

17. The apparatus of claim 16 wherein the second stage circuit further comprises digital signal processor (DSP) configured to process the digitized data stream.

18. The apparatus of claim 16 further comprising a sampler configured to synchronously sample the data stream.

19. The apparatus of claim 16 wherein the data stream is associated with a pulse-amplitude modulation format.

* * * * *